3,764,420
SUPPRESSION OF COMBUSTION INSTABILITY BY MEANS OF PBI FIBERS

David C. Sayles, Huntsville, Ala., assignor to the United States of America as represented by the Secretary of the Army
No Drawing. Filed Jan. 6, 1971, Ser. No. 105,750
Int. Cl. C06d 5/06
U.S. Cl. 149—21                                5 Claims

ABSTRACT OF THE DISCLOSURE

Suppression of combustion instability in solid propellant rocket motors is accomplished by means of polybenzimidazole fibers and other such fibrous, elastomeric materials which are thermally-stable and which retain their configuration under the combustion conditions encountered in an operating rocket motor.

The thermally-stable fibrous materials for suppressing combustion instability are incorporated into the solid propellant, and when the propellant burns, the thermally-stable fibrous materials are ejected into the rocket exhaust gas stream where they interfere with the flow pattern of the exhaust gases and damp out any unstable combustion.

BACKGROUND OF THE INVENTION

Well known in the solid propellant rocket motor art is the manufacture of resonance rods and their use in a solid propellant rocket motor to eliminate combustion instability. Various-shaped resonance rods have been employed in many different type rocket motors. The designs and requirements for resonance rods are well known in the art.

The use of resonance rods are presently used to mechanically damp out unstable combustion.

Another approach to suppressing combustion instability in the past has been to use an additive to the propellant composition. Amorphous carbon black, as would be expected from its range of shapes, has been effective to a reasonable degree (but not completely successful) in suppressing combustion instability. Its effectiveness can be attributed to the fact that it produces a two-phase flow pattern similar to that which results when aluminum is incorporated into propellant formulation. In the latter instance, the oxides of aluminum in the exhaust products produce a similar, but stronger, damping action of combustion instability depending upon particle size.

Materials as additives, such as glass filaments or nylon fibers would not be very effective in the application for suppressing combustion instability because they would undergo melting when exposed to the exhaust temperature of rockets. Submicron silica and powdered mica would perform comparably to carbon black.

Desirable would be a material for use as additive to solid propellant formulations which would be sufficiently thermally-stable to retain its configuration under the combustion conditions encountered in an operating rocket motor and which would be effective in controlling combustion instabilities.

Of particular interest would be a means to achieve combustion stability without the need for a resonance rod. The savings in the manufacturing costs of resonance rods and the rocket motor, both labor and materials, and the labor cost for installing the resonance rods would be significant. In addition without resonance rod a larger quantity of propellant could be loaded into the motor. It would then have a higher mass fraction.

An object of this invention is to provide an effective and improved means for controlling combustion instability associated with burning solid propellant of a rocket motor.

Another object of this invention is to provide a means for controlling combustion instability which means results from incorporation of heat-resistant fibers into a solid propellant composition.

Still another object of this invention is to provide a solid propellant composition which utilizes heat-resistant fibers as a part of the composition which fibers retain their shapes after being ejected into the rocket exhaust gas stream as the rocket motor burns.

SUMMARY OF THE INVENTION

Fibers of heat-resistant materials (e.g., polybenzimidazole fibers and other such fibrous, elastomeric materials) when added to a propellant composition serve to suppress combustion instability during the burning process of a solid-propelled rocket motor. A concentration of about 1% by weight of the other propellant ingredient is effective in suppressing combustion instability and to eliminate the need for resonance rod suppressors.

DESCRIPTION OF THE PREFERRED EMBODIMENT

The use of polybenzimidazole fibers in concentrations of about 1% when added to a crosslinked nitrocellulose composite propellant completely damped out the pressure fluctuations during motor burning. The use of the fibers of polybenzimidazole demonstrated that its use is an effective means of eliminating the need for resonance rod suppressors.

Table I below illustrates the use of the heat resistant fibers, polybenzimidazole fibers, in the experimental propellant composition B. A control propellant A which does not include polybenzimidazole is used as the standard for test purposes.

The double-base propellant (Control Propellant A) of Table I is typical of a propellant which experiences combustion instability. The basic ingredients include an energetic plasticizer, a binder material and an oxidizer. The double-base powder (binder material) is comprised of nitrocellulose, nitroglycerine, and a stabilizer, such as resorcinol or 2-nitrodiphenylamine, which serves to stabilize the nitrocellulose and nitrate ester plasticizers. A number of double base or single base powders are commercially available. These powders containing nitrocellulose in finely divided state serve as binder material. The double-base powder utilized in the propellants of Table I was constituted of about 10.1 parts nitrocellulose, of about 0.95 part nitroglycerine, and of about 0.20 part of 2-nitrodiphenylamine stabilizer. Other propellant ingredients of Table I are classified by the function they perform. These ingredients and functions include: the energetic plasticizers, triethylene glycol dinitrate and butanetriol trinitrate; the organic oxidizer, cyclotetramethylenetetranitramine; ballistic modifier, lead peroxide; resorcinol stabilizer; and toluene diisocyanate crosslinking agent. As known from experience gained from utilizing the energetic propellant compositions, one skilled in the art recognizes that the combination of the ingredients can be varied to meet the desired needs for thrust, burning rate, physical properties, etc. The propellant burning rates can be varied to meet certain needs by the use of catalysts which may be included in the basic composition, or which may be included as additives to the composition. Also, the burning rate may be changed by making changes in the ratio of oxidizer to fuel ratio or by using different particle sizes of ingredients. Other needs, such as stable burning of the propellant, has been met by the use of resonance rods; however, a distinct advantage is gained from the discovery that the incorporation of heat-resistant fibers into the propellant composition provides a means for suppressing combustion instability as the propellant burns in a rocket motor. When the motor burns, the heat-resistant fibers are ejected into the rocket exhaust gas stream where these fibers retain their shape. The fibers interfere with the flow pattern of the exhaust gases, and damp out unstable combustion without interfering with the burning rate and other desired qualities of the propellant.

TABLE I.—COMPOSITION OF PROPELLANTS WITH AND WITHOUT POLYBENZIMIDAZOLE

| | Percent by weight | |
|---|---|---|
| | Control propellant A | Experimental propellant B |
| Ingredients: | | |
| Double-base powder | 11.25 | 11.25 |
| Triethylene glycol dinitrate | 28.75 | 28.75 |
| Butanetriol trinitrate | 15.50 | 15.50 |
| Cyclotetramethylenetetranitramine | 40.00 | 40.00 |
| Lead peroxide | 4.00 | 4.00 |
| Resorcinol | 0.50 | 0.50 |
| Toluene diisocyanate (added) | 1.00 | 1.00 |
| Polybenzimidazole [1] | | 1.00 |
| Characteristics: Burning rate (i.p.s.) | 0.40 | 0.40 |

[1] A range of polybenzimidazole resin fibers were used. The usual size was 8 mil in diameter and 125 mil in length (size is not considered to be of any particular significance).

A typical polybenzimidazole resin, one which is available from a commercial source is prepared by heating 3,5,3',5' - tetraaminobiphenyl with 1,4-diphenyl phthalate as depicted below:

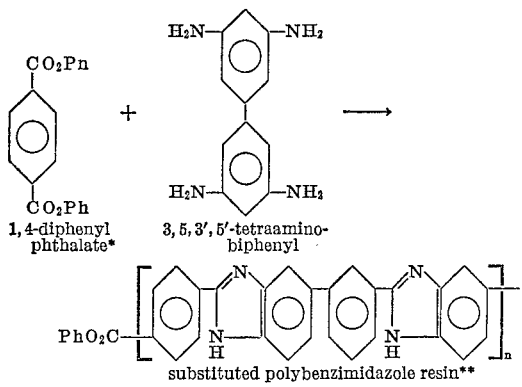

1,4-diphenyl phthalate*    3,5,3',5'-tetraaminobiphenyl substituted polybenzimidazole resin**

*1,2-diphenyl phthalate could be used instead of the 1,4-diphenyl phthalate 1,3-diphenyl phthalate is too expensive and not sufficiently reactive.
**Polyphenoxycarboxyphenylbenzimidazole.

where $n$ indicates multiple units of the condensed compound in polymeric arrangement.

The polybenzimidazole resin fibers are incorporated into the propellant with the other propellant ingredients. The final ingredient to be added is the toluene diisocyanate (crosslinking agent).

Assessment of the combustion instabilities was carried out by loading Control Propellant A and Experimental Propellant B, of Table I, into like rocket motors for testing. The rocket motors were fitted with pressure taps and gages positioned at the forward and aft end of the motors. As noted earlier about 1% of the polybenzimidazole resin fibers was sufficient, when added to the double-base (Experimental Propellant B) (e.g. cross-linked nitrocellulose composition propellant), to completely damp out the pressure fluctuations experienced during the burning of the rocket motor containing Control Propellant A.

The use of fibers of the type described are not limited to use in a particular size motor, i.e., this invention is applicable to all motors that use double-base propellants and which normally would require resonance rods. The use of polybenzimidazole resin fibers has been demonstrated to be an effective means of eliminating the use of resonance rod suppressors. A savings in manufacturing time and cost is recognized in addition to the primary benefit of improved pressure stabilization during the motor burning process. Higher performance can also be realized from motors which contain thermally-resistant fibers instead of a resonance rod. Additionally, polybenzimidazole resin fibers offer other benefits when used to replace the aluminum of aluminized composite propellant compositions to change to nonaluminized composite propellant compositions as described below.

Aluminized composite propellants, which are comprised of an oxidizer such as the inorganic oxidizer ammonium perchlorate, a binder material (e.g. double base powder, or single base powder, and polybutadienes and the like), energetic plasticizers, along with selected curatives, and additive of aluminum, have been used extensively in recent years. Where conditions make it necessary to provide increased transparency for the exhaust plumes (exhaust products formed from burning propellant and discharged from an exhaust nozzle) for visual and infrared sensors, the aluminum may be replaced with polybenzimidazole resin fibers. Additionally, the organic oxidizer of the type disclosed earlier herein may be used in place of the inorganic oxidizer to provide additional transparency for the exhaust plumes. Hence, in addition to the benefit achieved from suppression of combustion instability, the polybenzimidazole fibers help to provide the required transparency for exhaust plumes in environments where it is necessary to prevent detection of exhaust plume by visual or infrared sensors. Also, signals being emitted from a missile in flight would have less interference from the non-metallic polybenzimidazole fibers than from aluminum fibers or aluminum oxides in the exhaust plume. The uses described along with described propellant type (generally referred to as non-aluminized composite propellant) are particularly attractive for military tactical systems.

I claim:

1. In combination with a double-base propellant composition of a solid propelled rocket motor, fibers of heat-resistant and thermally-stable material comprised of polybenzimidazole resin fibers incorporated in said propellant composition for suppressing combustion instabilities encountered during the burning of said propellant composition; said propellant composition being comprised of energetic plasticizers selected from triethylene glycol dinitrate and butanetriol trinitrate, a binder material selected from a double-base powder and a single-base powder that contains nitrocellulose as a substituent thereof, and an organic oxidizer.

2. The combination as set forth in claim 1 wherein said energetic plasticizers are triethylene glycol dinitrate and butanetriol trinitrate; said organic oxidizer is cyclotetramethylenetetranitramine; and additionally containing the ballistic modifier, lead peroxide, and the stabilizer, resorcinol, in said composition and containing the crosslinking agent toluene diisocyanate as an added ingredient to said composition.

3. The combination as set forth in claim 2 wherein said binder material selected is double-base powder that is constituted of about 10.1 parts nitrocellulose, of about 0.95 nitroglycerine, and of about 0.20 part 2-nitrodiphenylamine, said double-base powder being present in said propellant composition in an amount of about 11.25 percent by weight; said triethylene glycol dinitrate being present in said propellant composition in an amount of about 28.75 percent by weight; said butanetriol trinitrate being present in said propellant composition in an amount of about 15.50 percent by weight; said cyclotetramethylenetetranitramine being present in said propellant composition in an amount of about 40.00 percent by weight; said ballistic modifier lead peroxide being present in said propellant composition in an amount of about 4.00 percent by weight; said stabilizer, resorcinol, being present in said propellant composition in an amount of about 0.50 percent by weight; said crosslinking agent, toluene diisocyanate, is used in an amount of about 1.00 percent by weight of the total combined ingredients of said propellant composition; and said polybenzimidazole resin fibers is used in an amount of about 1.00 percent by weight of the total weight of the combined ingredients of said propellant composition.

4. In combination with a non-aluminized composite propellant composition comprised of an oxidizer selected from ammonium perchlorate and cyclotetramethylenetetranitramine, a binder material selected from a double base powder, a single base powder, and polybutadienes, and energetic plasticizers selected from triethylene glycol dinitrate and butanetriol trinitrate, polybenzimidazole resin fibers for suppression of combustion instabilities and for providing increased transparency to the exhaust plume formed from exhaust products discharged from an exhaust nozzle when said propellant composition is burned in a rocket motor.

5. A method for suppressing combustion instabilities encountered during the burning of a double-base propellant composition comprising incorporating into said propellant composition an amount up to about 1 percent by weight of said propellant composition, a heat-resistant and thermally-stable material comprised of polybenzimidazole resin fibers whereby said fibers are subsequently ejected during the propellant burning into the rocket exhaust gas stream wherein said fibers retain their shape and interfere with the flow pattern of the rocket exhaust gases of said stream and in this manner damp out any unstable combustion.

References Cited
UNITED STATES PATENTS 3,141,294   7/1964   Laurence et al. _____ 149—44 X BENJAMIN R. PADGETT, Primary Examiner U.S. Cl. X.R.

60—219; 102—102; 149—18, 19, 92, 104